Oct. 20, 1970          C. L. BABCOCK          3,535,098
METHOD FOR MAKING A LIGHT-WEIGHT, GLASS CERAMIC MIRROR BLANK
CONTAINING A CORE OF AT LEAST ONE LAYER OF SPHERES
Filed April 14, 1966          4 Sheets-Sheet 4

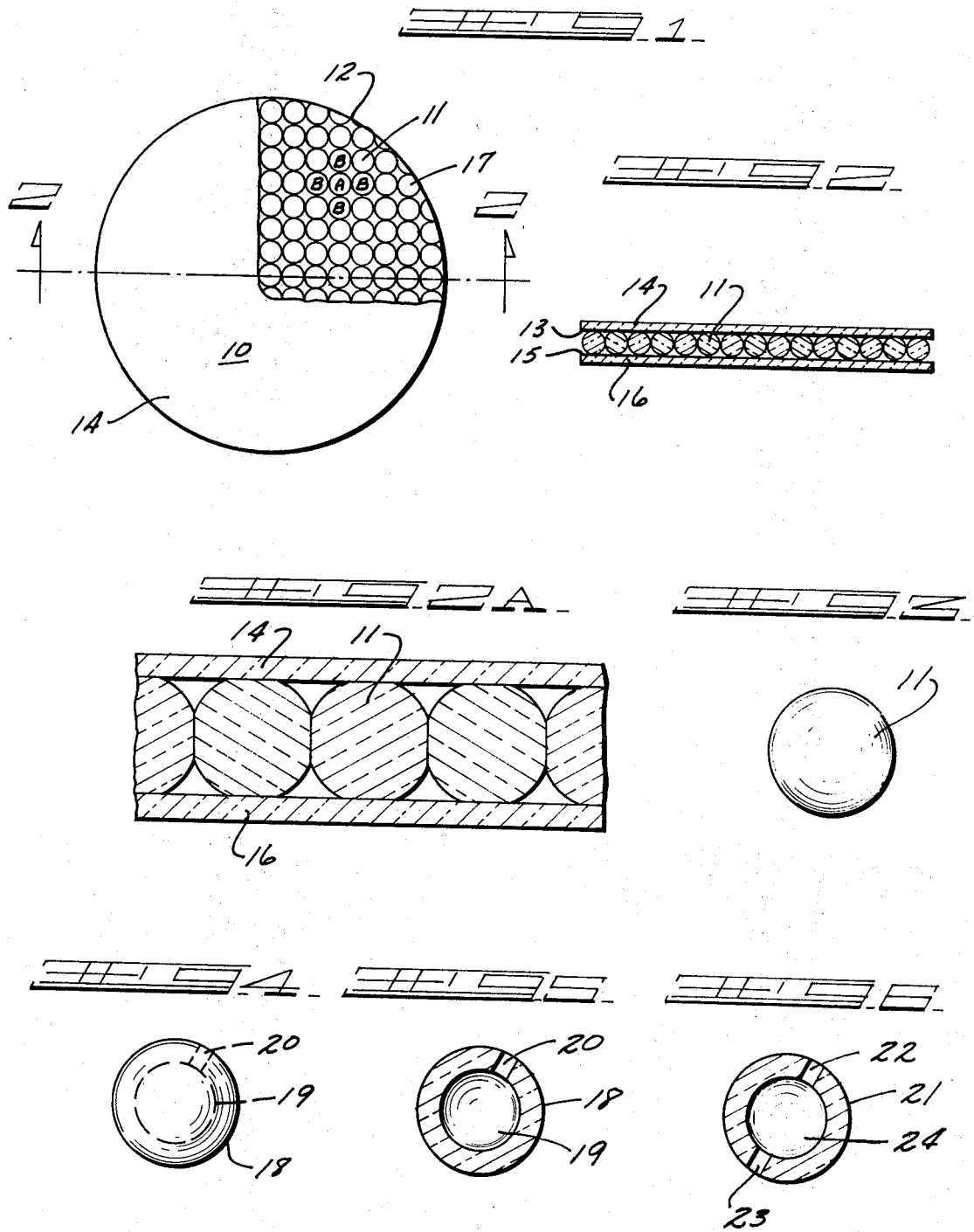

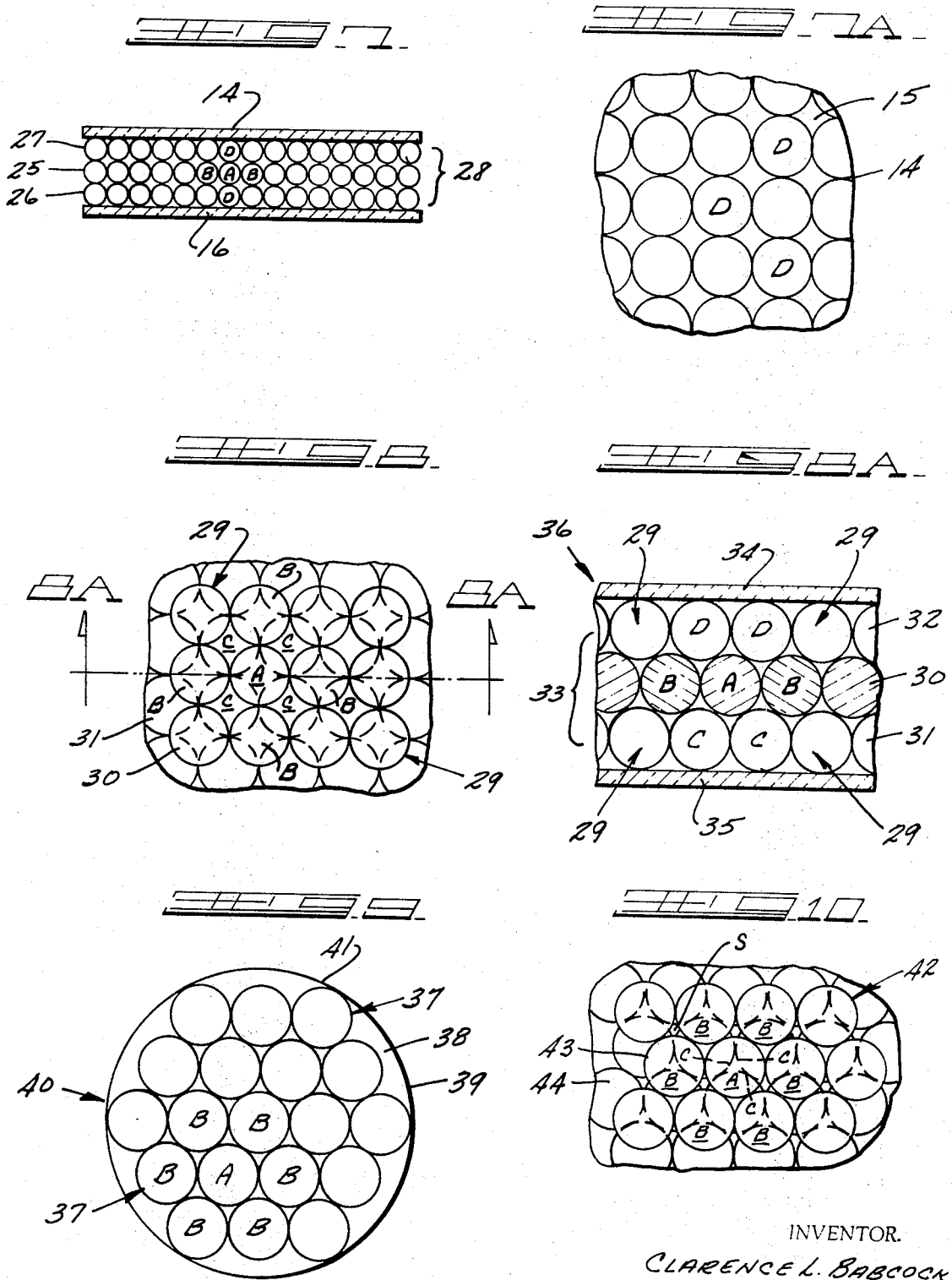

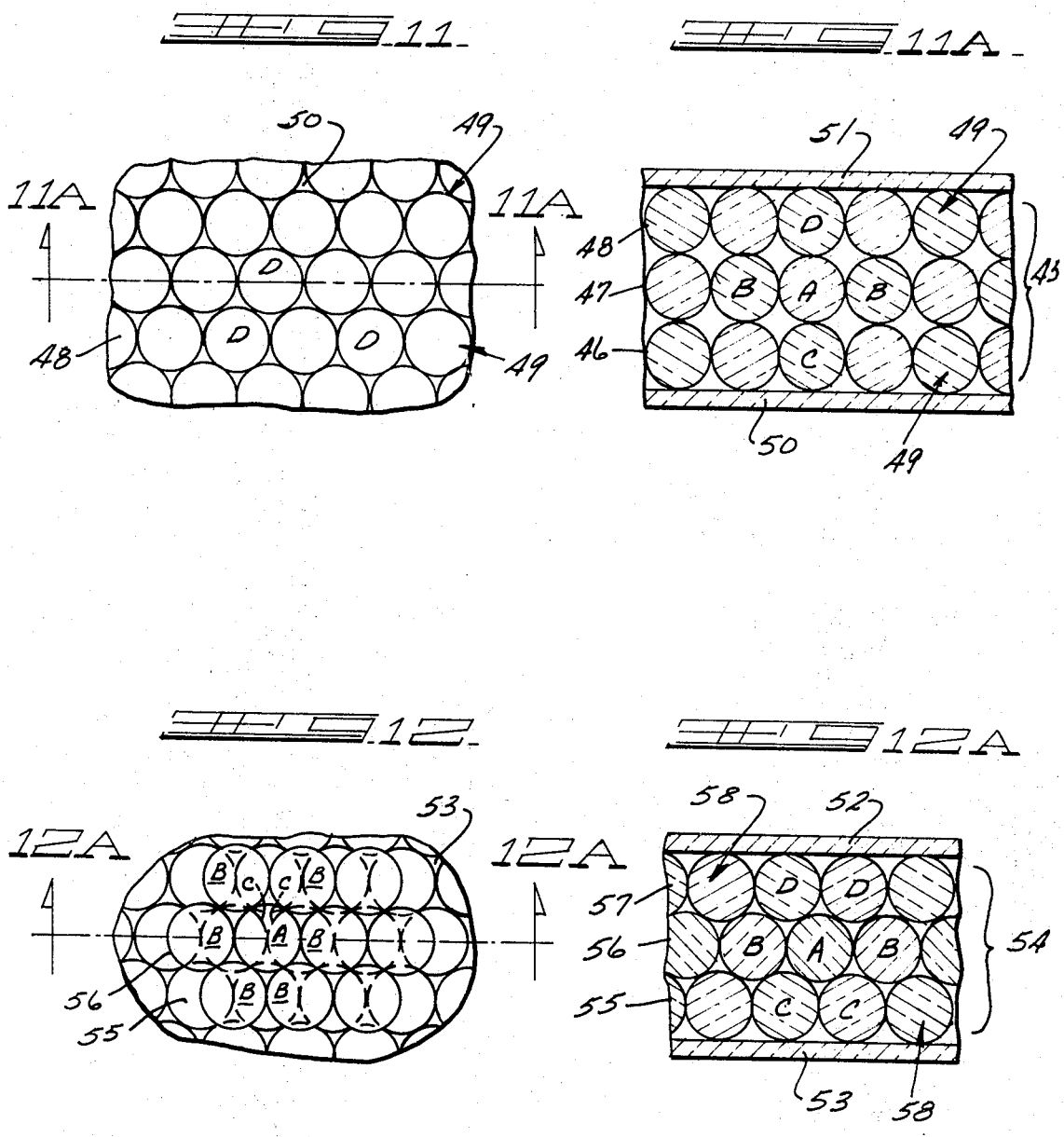

INVENTOR.
CLARENCE L. BABCOCK
BY W. A. Schaich
      L. Lynch
           ATTORNEYS The United States Patent Office 3,535,098
Patented Oct. 20, 1970

3,535,098
METHOD FOR MAKING A LIGHT-WEIGHT, GLASS CERAMIC MIRROR BLANK, CONTAINING A CORE OF AT LEAST ONE LAYER OF SPHERES
Clarence L. Babcock, Toledo, Ohio, assignor to Owens-Illinois, Inc., a corporation of Ohio
Filed Apr. 14, 1966, Ser. No. 542,588
The portion of the term of the patent subsequent to May 26, 1987, has been disclaimed
Int. Cl. C03b 29/00, 11/08
U.S. Cl. 65—33                    8 Claims

ABSTRACT OF THE DISCLOSURE

Unitary rigid article, especially a telescope mirror blank comprising a glass or thermally crystallized glass plate having a core member sealed to the under surface of the plate. The core member is at least one layer of a plurality of glass or thermally crystallized glass spheres, the spheres being sealed together at adjacent contracting surfaces. Each of the spheres in the at least one layer is a tangent to a plane disposed below the layer.

---

This invention relates to articles of substantially thickness made from a glass, such as a thermally crystallizable glass, and to a method for making such articles. More particularly, the present invention relates to telescope mirror blanks and to a method for making lightweight telescope mirror blanks from a glass, such as a thermally crystallizable glass.

In a further aspect, the present invention relates to lightweight, transparent, crystallized glass telescope mirror blanks which are particularly valuable because of their relatively low coefficients of thermal expansion.

Special problems of a difficult nature are encountered in the manufacture of telescope mirror blanks of relatively large diameters and thicknesses. Since the condition and the configuration of the reflecting area surface of the finished mirror determines the accuracy of the reflected image and because the mirror must be of sufficient rigidity so as to prevent even the slightest movement or distortion of the reflecting mirror surface, the thickness of the mirror must be substantial in order to insure sufficient strength and rigidity. Increasing thickness brings added weight which further complicates the already complex problems involved in supporting large mirrors.

Since the ratio of the diameter of the mirror blank to the thickness thereof is usually approximately six to one, it is readily evident that a mirror blank of one, two, four or even six hundred inches in diameter comprises a large amount of glass in terms of size and weight. Casting such a mirror blank of fused silica, borosilicate glass or other known glass materials involves a long, tedious process. The problems encountered with respect to cooling and annealing the glass to insure uniform expansion characteristics being imparted to all portions thereof are extremely complex. Of course, any variations in the expansion characteristics of one area of the glass with respect to another area will adversely affect the reflecting surface and the quality of the image being observed therefrom. It is important that the coefficient of thermal expansion be as low as possible and, ideally, be zero, so that little or no expansion occurs when the mirror is exposed to varying temperatures during the use of the telescope.

Attempts have been made in the past to decrease and lessen the overall weight of such telescope mirrors by forming a mirror blank of a minimum thickness and then subsequently bonding the under surfaces of the mirror blank to glass members of the same composition, which glass members as a whole impart a certain rigidity to the ultimate reflecting mirror. One example of this is the use of so-called "egg crate" construction wherein a plurality of elongated glass strips having spaced slotted portions along one longitudinally extending edge are interconnected with a plurality of similar glass strips extending at right angles thereto, the connection being at the respective slotted portions so that the final structure is of the same thickness or height as the individual strip, just as is the case of he interconnected cardboard members used with an egg crate to separate the individual eggs.

However, due to the overall size of the glass strips and the thickness of the mirror blank, considerable problems occur when the glass strips are subjected to temperatures sufficient to fuse them together along adjoining portions and also fuse the upper surface of the interlocked egg crate structure to the bottom surface of the mirror blank. A glass backup plate of sufficient thickness to impart rigidity to the mirror must also be fused to the other surface of the egg crate structure. Since the formation or construction of mirrors is a very delicate operation and the temperature to which the glass is subjected as it is being cooled has to be very carefully controlled, it will be apparent that difficulties are encountered as soon as an attempt is made to fuse the egg crate glass structure to the bottom surface of the glass mirror blank and to the backup plate. To do this successfully is a tedious, time-consuming operation which adds considerably to the cost of the final product.

Another method for decreasing the weight of a telescope mirror blank is to make a mirror blank from a plurality of hollow polyhedrons positioned in such a manner with respect to each other that no contacting surface of any polyhedron is in a plane which is parallel to the longitudinal axis of the mirror blank, i.e., when the mirror blank is in a horizontal pbosition, a plane surface of a component of the mirror blank is never perpendicular to the horizontal. This arrangement provides for the application of pressure on each sealing surface of the polyhedrons due to the force of gravity and such pressure is maintained throughout the treatment steps, resulting in a unitary telescope mirror blank of the invention. The mirror blank, consisting essentially of a plurality of the aforesaid polyhedrons, may be formed to define a surface which is subsequently ground, figured, polished and coated with aluminum to form the reflecting layer of the mirror. Alternatively, the polyhedrons only form the rigid core member to which is fused a glass layer of the necessary thickness, which layer eventually is processed to form the reflecting surface thereon. This method is disclosed in copending application Ser. No. 518,446, filed Jan. 3, 1966, wherein applicant is one of the co-inventors. That application and the present one have been assigned tot he same assignee.

In aforesaid application Ser. No. 518,446, the preferred embodiment discloses the use of cubes and portions of cubes of glass which are assembled to form the cores. While, of course, other polyhedrons may be used in accordance with the disclosure and are encompassed by the claims, such other polyhedrons must be carefully made to exacting dimension and correctly positioned within the mold or jig in order to make the necessary mirror blank core. All of these operations add to the cost of the final product.

Additional problems are incurred in the positioning and mounting of large reflecting mirrors in the telescopes. Because of the effect of any strain on the shape of the reflecting surface, complex mounting means must be utilized for supporting the mirror in the telescope. In these cases, extreme precautions must be taken to insure that the mirror is properly supported and positioned in a strain-free condition which must be independent and irrespective of the position of the telescope as it is moved to observe different areas of the sky.

Accordingly, it is an object of the present invention to provide an astronomical mirror blank which overcomes these shortcomings and disadvantages which exist in the prior art.

It is a further object of the present invention to provide a method of making an astronomical mirror blank which method avoids many of the disadvantages which exist in methods used heretofore.

It is another object of the present invention to provide a method of forming a lightweight, low expansion, vitreous telescope mirror blank.

Another object of the present invention is to provide a lightweight, transparent, thermally crystallized glass-ceramic telescope mirror blank having a low lineal coefficient of thermal expansion.

A further object is to provide for a low expansion, thermally crystallized glass telescope mirror.

Still another object of the present invention is to provide other lightweight articles which are made from a glass, including from a thermally crystallizable glass.

A further object of the present invention is to provide a method for forming other lightweight articles from a glass, including from a thermally crystallizable glass.

In attaining the foregoing objects, one feature of the present invention resides in a method of making an astronomical mirror blank having a rigid core structure firmly secured to the bottom surface of a glass plate, the upper surface of which plate is to be subjected to further treatment to form the reflecting surface of the telescope mirror. The core is formed of at least one layer of spheres, either hollow or solid, of glass or thermally crystallized glass, which spheres are bonded or fused together at adjacent contacting surfaces and are bonded or fused to the bottom surface of the aforesaid layer of glass along points of contact therewith. In a preferred embodiment, a glass backup plate is provided which is disposed at the opposite side of the core structure and is also fused or bonded thereto along contacting points with the spheres. Thus, the at least one layer of spheres forms a core member disposed between two layers of glass or thermally crystallized glass, wherein the arrangement of spheres is such that each inner sphere of the core is in contact with at least four and preferably six other spheres within the same layer. When the core member comprises two, three or more layers of spheres, each inner sphere within each inner layer is in contact with at least six spheres, i.e., within its own layer and in the layers above and below it, and usually eight, ten and preferably twelve spheres. The more contacts each sphere has with other spheres, and then fusing the spheres together at each point of contact by slumping, the more rigid will be the core member formed therewith. Because of the particular core structure, a plurality of passageways are formed therethrough which provide for the subsequent treatment of the mirror blank by convective heat.

Another feature of the invention resides in having the spheres formed of a thermally crystallizable glass composition and subjecting the prearranged configuration of spheres to temperatures sufficient to slump and fuse together adjoining surfaces, to nucleate the composition and subsequently to crystallize the composition to form a unitary, lightweight, thermally crystallized mirror blank.

Still another feature of the present invention resides in providing some or all of the spheres with cavities which communicate with the outer surface of the spheres through openings smaller in cross-sectional areas than the cross-sectional areas of the cavities, and wherein the hollow spheres are so arranged that a plurality of passageways are provided for the free ingress or egress of fluids to or from each cavity to the outside of the mirror blank.

Other objects, features and advantages of the present invention will become apparent from the following detailed description thereof taken in conjunction with the drawings wherein:

FIG. 1 is a plan view of one embodiment of the telescope mirror blank of the present invention, having a portion of the upper face plate cut away to show one arrangement of a plurality of spheres which form the mirror blank core member;

FIG. 2 is an elevational, sectional view of the mirror blank of the invention taken along line 2—2 of FIG. 1;

FIG. 2A is an enlarged view of a portion of the mirror blank illustrated in FIG. 2 and showing the flattened, fused, contacting surfaces after slumping has occurred;

FIG. 3 is an enlarged side view of a sphere which is utilized in making the mirror blank illustrated in FIG. 1;

FIG. 4 is a side view of a hollow sphere suitable for purposes of the invention and having an opening therethrough communicating with a cavity formed therein;

FIG. 5 is a sectional view of the sphere illustrated in FIG. 4;

FIG. 6 is a sectional view of a hollow sphere having a pair of openings therethrough communicating with a cavity formed therein;

FIG. 7 is an elevational sectional view similar to FIG. 2 of another embodiment of a telescope mirror blank of the invention wherein the core member comprises a plurality of layers of spheres;

FIG. 7A is a top plan view through a portion of the mirror blank of FIG. 7 to show the arrangement of the spheres which comprise the core member for the blank;

FIG. 8 is a plan view of a portion of still another embodiment of a telescope mirror blank core member of the invention comprising a plurality of layers of spheres in a particular arrangement;

FIG. 8A is a side elevation view of the arrangement of spheres illustrated in FIG. 8 but shown in a portion of a telescope mirror blank;

FIG. 9 is a plan view of the underside of a telescope mirror blank of the invention illustrating another arrangement of a layer of spheres wherein each inner sphere is in contact with six other spheres;

FIG. 10 is a plan view of another arrangement of at least two layers of spheres illustrating how the inner spheres of the core member are in contact with at least nine other spheres;

FIG. 11 is a plan view of a portion of a telescope mirror blank showing still another arrangement of three layers of spheres and illustrating how the inner spheres of the core member are in contact with eight other spheres;

FIG. 11A is an elevational sectional view of the embodiment of the mirror blank core illustrated in FIG. 11 and taken along line 11A—11A;

FIG. 12 is a plan view of a portion of a mirror blank of still another embodiment of the invention illustrating a further arrangement of spheres wherein the inner spheres of an inner layer are in contact with ten other spheres;

FIG. 12A is an elevational sectional view of the mirror blank taken along line 12A—12A of FIG. 12;

Figure 13:
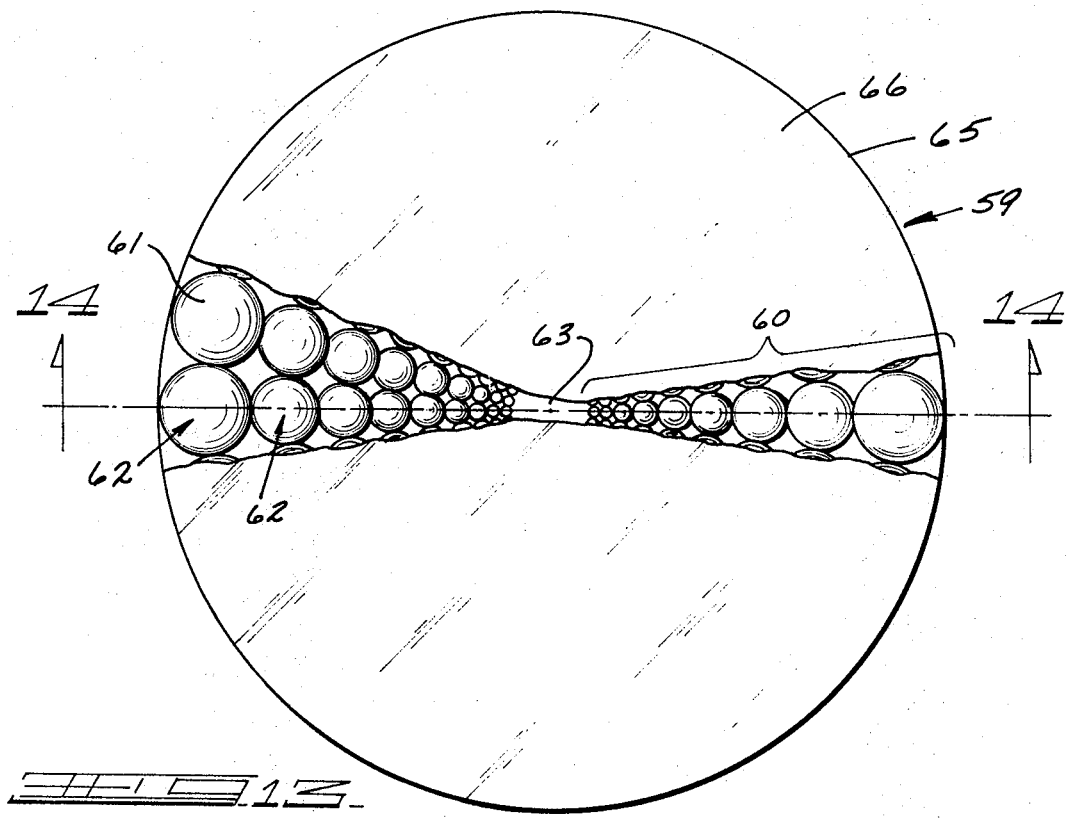
FIG. 13 is a plan view of still another embodiment of the telescope mirror blank of the invention showing a portion of the face plate removed.

In accordance with the present invention, an astronomical mirror blank having a pair of oppositely disposed surfaces is formed from at least one layer of spheres, all of the same size and dimensions, and made of a thermally crystallizable glass composition. As shown in FIGS. 1–3, inclusive, one embodiment of the telescope mirror blank 10 is formed from a plurality of spheres 11 arranged in such a manner that these spheres disposed inwardly from the periphery 12 of the blank, are in contact with adjoining surfaces of four other spheres and also in contact with the bottom surface 13 of the upper reflecting plate 14 of thermally crystallizable glass and the upper surface 15 of backup plate 16, also preferably of the same glass composition. The plurality of spheres in the final product form a mirror blank core member 17 and the spheres are somewhat flattened along all contacting surfaces due to slumping, as illustrated in FIG. 2A.

While spheres 11 are shown as being solid in the embodiment of the mirror blank of FIGS. 1 and 2, the spheres may also be hollow so as to further decrease the weight of the core member 17 and, correspondingly, decrease the weight of the final mirror blank. The arrangement of the spheres in the core member 17 provides passageways throughout the peripheral edge 12 of the mirror blank for the passage of heated fluids therethrough for the necessary slumping to occur and for the subsequent treatment of the mirror blank. If desired, the backup plate 16 may also be perforated to assist in the passage of the heated fluids about the spheres and the adjoining surfaces 13, 15 of layers 14, 16, respectively.

Use of spheres 18, FIGS. 4 and 5, having a cavity 19 communicating with the exterior thereof by means of opening 20 of a cross-sectional area less than the cross-sectional area of the cavity, and arranging the spheres in such a manner that the heated fluid passes into the spheres during the subsequent heat treatment steps to which the mirror blank is subjected, provides for more uniform heat treatment of the inner and outer surfaces of the sphere. A greater degree of uniformity is achieved when spheres 21. FIG. 6, having at least two openings 22, 23 communicating with a cavity 24, are utilized, since this more readily provides for the ingress and egress of the heated fluids therethrough and about the adjacent spheres in the mirror blank core member formed therewith.

By use of the simple packing arrangement shown in FIGS. 1 and 2, each inner sphere 11 (referred to as A in FIG. 1) is in contact with four other spheres (referred to as B) and this arrangement is hereinafter referred to as a four-sphere contact arrangement. When the spheres 11 are arranged in a plurality of layers, each layer of the four-sphere contact arrangement as shown in FIGS. 7 and 7A, in such a manner that the body of each sphere in the middle layer 25 is directly above a sphere in the lower layer 26 and directly below a sphere in the next higher layer 27, then all spheres, such as A, disposed inwardly of the periphery of the three-layered core member 28 and located in middle layer 25 are in direct contact with six other spheres, namely, four in layer 25, referred to as spheres B in the drawing, and one each in layers 26 and 27, identified as C and D in the drawing. When upper plate 14 is transparent, the arrangement of spheres in a top plan view is shown in FIG. 7A, looking down onto the upper surface 15 of the backup plate 16.

FIG. 8 illustrates another arrangement of spheres 29 wherein two layers 30, 31, each of the aforesaid four-sphere contact arrangement, are disposed one 30 above the other 31 in such a manner that each inner sphere 29 in the upper layer 30, designated as A, is in contact with four other spheres, designated as B, within layer 30, and each sphere A, also rests upon and is in direct contact with four other spheres in layer 31 below it. These four spheres in layer 31 are designated by the letter C. When another layer 32 of spheres, of the same four-sphere contact arrangement, and identical to bottom layer 31, is disposed above layer 30 in such a manner that each sphere 29 in layer 32 is centered directly over each sphere 29 in bottom layer 31, then the four spheres D in layer 32 which are directly above the four spheres C in layer 31 are also in contact with sphere A. This is readily evident when considering the views of FIGS. 8 and 8A together. Thus, each inner sphere A in the middle layer 30 is in contact with twelve other spheres, to provide an excellent, rigid arrangement of spheres in the core 33 disposed between the upper plate 34 and backup plate 35 of mirror blank 36.

FIG. 9 illustrates still another arrangement of spheres 37 secured to the under surface 38 of an upper plate 39 wherein each inner sphere A is in contact with six other spheres B. This arrangement will hereinafter be referred to as the six-sphere contact arrangement. Since the purpose of the core member 40 comprising a plurality of contacting spheres which are subsequently shaped and fused together is to form a rigid support for the upper plate 39, it is not absolutely essential for the spheres 37 to extend to the entire periphery 41 of upper plate 41. All that is necessary is for the core member 40 to provide the necessary rigid support. However, if desired, the core member 40 can be made completely annular above its periphery but utilizing portions of spheres, as shown in the arrangement illustrated in FIG. 1.

FIG. 10 illustrates still another arrangement of spheres 42 wherein two layers 43, 44, each layer of the aforesaid six-sphere contact arrangement, are disposed one 43 above the other 44 in such a manner that each inner sphere 42 in the upper layer 43, designated as A, is in contact with six other spheres, designated as B, within layer 43 and each sphere A also rests upon and is in direct contact with three other spheres, designated as C, in layer 44 below it. When a third layer of spheres (not shown) of the same six-sphere contact arrangement and identical to bottom layer 44 is disposed above layer 43 in such a manner that each sphere in the third layer is centered directly over each sphere 42 in bottom layer 44, then the three spheres in this third layer which are directly above the three spheres C in layer 44 will also be in contact with sphere A of middle layer 43. In another arrangement the third layer disposed above layer 43 has the same close packed hexagonal arrangement as the other layers, but each sphere is centered directly above each space S. The spaces S in plan view FIG. 10 are the spaces between three touching spheres in layer 43 which are directly over similar spaces left by three touching spheres in layer 44. In either arrangement, sphere A, as all inner spheres in layer 43, not only is in direct contact with twelve other spheres and subsequently fused to these twelve spheres to provide a rigid supporting network or core for a mirror blank, but the spheres are more closely packed together than the spheres shown in the arrangement of FIGS. 8 and 8A.

FIGS. 11 and 11A illustrate another embodiment of the present invention wherein the core member 45 comprises three layers 46, 47, 48 of spheres 49, each layer being of the six-sphere contact arrangement discussed above. The spheres in layers 47 and 48 are directly body-centered above the spheres in layer 46. Thus, an inner sphere A in layer 47 (FIG. 11A) is in contact with six other spheres B in layer 47 and, in turn, is in contact with a single sphere C in layer 46 directly below it and with single sphere D in layer 48 directly above it, i.e., sphere A is in contact with a total of eight spheres. The spheres in layers 46 and 48 are also in contact with the backup plate 50 and upper plate 51, respectively, of the mirror blank.

In the embodiment shown in FIGS. 12 and 12A, the mirror blank comprises upper plate 52, backup plate 53 and a core member 54 consisting of three layers 55, 56, 57 of spheres 58, each layer being of the six-sphere contact arrangement illustrated in FIGS. 9 and 11 above.

The spheres in the third or upper layer 57 are directly above, i.e., body-centered, the spheres in the first or bottom layer 55. The spheres in the second or middle layer 56 instead of being directly above and below the spheres in the first and third layers, as they are in FIGS. 11 and 11A, are directly above and below the point of contact of two spheres, i.e., the middle layer 56 is shifted the distance of one-half sphere to the right (or to the left) relative to layers 55 and 57. Thus, an inner sphere A in middle layer 56 is in contact with ten other spheres, namely, six spheres B in its own layer, two spheres C in layer 55 and two spheres D in layer 56. Rather than confuse the drawing, spheres D have been omitted from FIG. 12. However, the spheres in layer 57 are disposed directly above the spheres in FIG. 55, as is evident from FIG. 12A.

Figure 14:
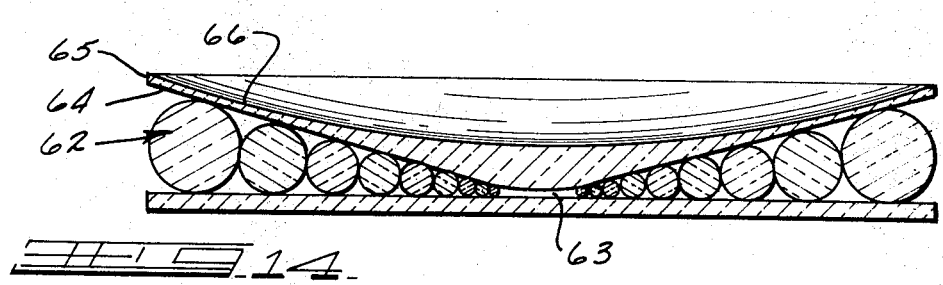
FIG. 14 is a sectional view of the embodiment shown in FIG. 13 and taken along lines 14—14 thereof.

Still another embodiment of a mirror blank 59 is illustrated in FIGS. 13 and 14. The core member 60 consists of a plurality of annular rings 61 of spheres 62 with the spheres in the outermost ring having the largest diameter and the spheres in each successive ring being of decreasing diameter, with the spheres having the smallest diameter forming the innermost ring and surrounding the opening 63 in the center of core member 60. By this arrangement of spheres, a concave supporting surface is formed by core member 60 adapted for seating convex surface 64 of upper plate 65, which in turn is provided with concave surface 66. Surface 66 can more readily be ground, figured and polished to the proper configuration and subsequently coated with a reflecting layer, such as aluminum, in any known manner, to form the reflecting telescope mirror.

Figure 15:
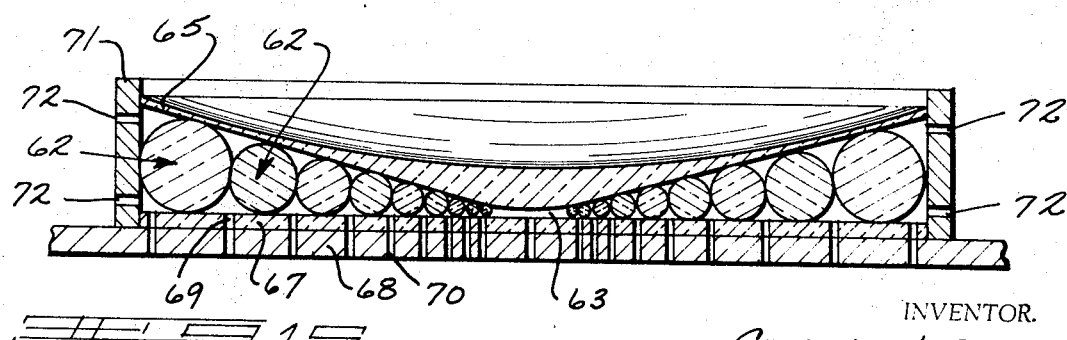
FIG. 15 is a sectional view of an apparatus which may be utilized to produce the embodiment of the mirror blank illustrated in FIG. 13.

To make the telescope mirror blank of FIG. 13, apparatus of the type illustrated in FIG. 15 may be used, although other apparatus can also be used to hold the arrangement of components during assembly and subsequent heat treatments. A perforated backup plate 67 is placed upon a perforated surface 68 with the perforations 69 in the plate communicating with perforations 70 in surface 68. An annular split ring graphite mold 71 is placed about the backup plate and resting in contact with the surface 68. Spheres 62 are then arranged in annular rings with those in the outermost ring being of largest diameter and those in each succeeding ring extending toward the center being of smaller and smaller diameter. When the spheres have been assembled, a graphite plug (not shown) may be inserted in opening 63 to prevent any movement toward the center of the spheres in the innermost ring.

Upper plate 65 is then placed within the mold 71 and rests upon the arrangement of spheres. Mold 71 is provided with a plurality of openings 72 disposed between the backup plate 67 and upper plate 65 and located in such a manner that the openings are not blocked by any of the large spheres in the outermost ring. By passing heated fluids, such as air, inert gases, and the like, through openings 70 and 69, throughout the arrangement of spheres 62, and out through openings 72, the temperature within the mirror blank assembly can be controlled. Thus, the assembly, including the mold 71 and surface 68, can be readily placed within an oven and fluid inlet and outlet conduits (not shown) can be placed in communication with openings 69, 70 and 72 respectively. Thus, the temperature of the heated fluid passing through the core assembly can be regulated so as to correspond to the temperature within the oven, thus providing uniform heat treatment of the mirror blank. If desired, and to give more uniform heat treatment, the direction of flow of the heated fluid through the openings 69, 70 and 72 can be periodically reversed. Necessary pumping and exhaust means can be used and there is no need to describe them in detail in this specification.

Several advantages are to be found in the use of at least one layer of spheres in the construction of a monolithic mirror blank in accordance with the invention. The spheres can be produced at high rates on a machine, and sphere size, strain level and freedom from defects can be easily controlled during the production process. The close-packing arrangement permits convection heat to be used during the subsequent heat treating process whereby sufficient slumping is permitted to occur as to provide a rigidly bonded layer or layers of spheres secured to the upper reflecting surface of a mirror blank and, if desired, also to the backup plate. Of course, by making the spheres hollow and yet of a wall thickness sufficient to rigidly support the surface layer of the mirror blank which eventually has the reflecting layer formed thereon, the over-all weight of the mirror is further reduced without sacrificing the required rigidity of the unit. Each sphere can be considered as consisting of two hemispheres which, structurally, evenly distribute the load carried by the plurality of spheres which form the core member.

The individual spheres utilized in the present invention can be prepared in any number of ways. For example, when spheres of relatively small sizes are to be used, they can readily be produced from a continuous glass tank which feeds a marble machine. The spheres or marbles are given a uniform annealing treatment, or a quenching, depending upon the strain level desired, and then are acid-etched or otherwise given prepared surfaces to minimize crystallization during the subsequent fusing process to which the spheres are to be subjected. Hollow spheres, particularly those of relatively larger sizes, can be prepared by the methods shown in the copending application of Austin et al., Ser. No. 468,691, filed July 1, 1965, now Pat. No. 3,484,328 issued Dec. 16, 1969 and assigned to the assignee of the present application, as well as the method for making hollow glass articles as taught in the application of Keefer, Ser. No. 503,831, filed Oct. 23, 1965, and assigned to the assignee of the present application, the entire disclosures of both of the aforementioned applications being incorporated herein by reference. The spheres having cavities therein, such as shown in FIGS. 4 and 6, can also be made by known blow molding techniques. Solid shapes can also be formed by conventional glass-forming techniques such as pressing or casting. Solid spheres of fused silica can be formed according to conventional prior art methods.

The thickness of the walls of the hollow spheres will vary with the size of the spheres and with the diameter and thickness of the mirror being formed, but the thickness must always be that which is sufficient to maintain the resulting mirror blank and reflecting telescope mirror made therefrom rigid under operating conditions when viewing astronomical bodies and the like. The size of each sphere will depend in part upon the ultimate size of the mirror blank. While spheres having a diameter of up to 3 to 6 inches will be satisfactory, spheres having diameters of up to 12 to 15 inches or even more can be utilized to form the larger telescope mirror blanks.

In making the mirror blanks, a multitude or plurality (i.e., at leats ten and usually many more) of spheres are positioned in the manner illustrated in the various embodiments of the drawing so that pressure is exerted on all contacting surfaces that are to be sealed. The pressure between the contacting surfaces assists in bonding during the sealing step. The assembly is thereafter heated for a time and temperature necessary to effect bonding.

In an important embodiment of the invention, the spheres are formed of a thermally crystallizable glass composition. It is preferred that the glass members, after forming, be cooled by relatively rapid cooling rather than subjecting the glass members to a protected annealing operation. A useful procedure is to air quench the glass members to minimize nuclei formation.

A very serious problem, namely, surface crystallization, can occur during the sealing or fusing step. The surface crystallization is promoted on ground and polished, sawed or otherwise uncleaned glass surfaces and the glass crystallization on the surface is very rapid at sealing temperatures and can prevent good bonding of the parts. However, surface crystallization can be retarded by acid washing or by ion exchange (replacing $Li^+$ ions with $Na^+$ or $K^+$ ions). After the spheres have been assembled in the jig or support, such as in the manner discussed above, the assembly is heated to the temperature range in which bonding is effected in a first step to obtain glass-to-glass sealing of the parts. In a first embodiment this sealing or fusing step is effected at a temperature range substantially above a subsequent nucleation step temperature range. In such embodiment, the assembly, after being heated to about the annealing point temperature, is rapidly heated to above the nucleation temperature of the glass and to the temperature at which the viscosity of the adjoining, contacting spherical surfaces is such that fusion takes place and the spheres become fused to form the unitary mirror blank. During the rapid heating, any nuclei which may have formed in the glass are dissolved. By rapidly heating the glass to the fusion temperature, the formation of large nuclei, which are difficult to dissolve, is avoided.

As stated, prior to bonding the spheres together and to the other members, the parts are assembled and arranged as desired and then preheated at a normal rate to about the annealing temperature, and then rapidly heated to the temperature where the fusion or bonding is effected. In a first embodiment, this step is effected at a temperature well above the temperature range at which a subsequent nucleation heat treatment step is effected.

The three major steps involved in the thermal processing steps are fusion, nucleation and crystallization. Although it is possible to carry out the entire process isothermally but over an extremely long period of time, the various steps are usually effected, as in this first embodiment, at different temperature plateaus or ranges. Conveniently, glass temperatures may be expressed in terms of the viscosity of the glass at that temperature, inasmuch as a large number of different glass compositions could necessitate identification of an equally large number of temperatures and would be impractical for present purposes. Therefore, it is most convenient to define the temperature for a specific glass in terms of the desired viscosity for working at that point. In this embodiment the temperature range in which this high-temperature fusion step is effected is generally in the range of the temperatures where the viscosity of the glass in poises is from about $10^9$ to about $10^5$, more usually in the range of about $10^{7.5}$ to $10^{8.5}$. In heating up to the fusion temperature step range, after reaching about the annealing point temperature, the rate of heating is preferably rapid, that is, at a rate of more than 10° C. per minute, in order to redissolve very small, incipient nuclei and to prevent the formation and growth of nuclei. Once the glass has been heated above the annealing point range, the glass can be very quickly heated because the strains have been relieved. When the fusion temperature range to be employed for the fusion step has been attained, the assembly is allowed to remain at such temperature range until fusion has been effected. The bonding of the parts takes place by fusing and some slumping, without premature surface crystallization preventing bonding.

After fusion, the bonded assembly is subjected to the thermal in situ nucleation and crystallization heat treatment schedule to bring about the proper amount of nucleation and subsequent crystallization to produce a low expansion telescope mirror blank, preferably transparent, which contains as the predominant crystalline species lithium-containing crystalline phases, either as beta-eucryptite or beta-eucryptite-like crystals or as beta-spodumene or beta-spodumene-like crystals, or both, as indicated by X-ray diffraction data. A multitude of such crystalline species, in random orientation and dispersed in a glassy matrix remaining as a result of in situ crystallization, are to be found in the glass-ceramic mirror blanks of the present invention. For a transparent mirror substantially all of the crystals of the thermally crystallized glass are of a diameter of less than about 1/3 micron measured across the largest lineal dimension of the crystals.

In this embodiment, upon completion of fusion of adjacent surfaces, the mirror blank assembly is cooled to the nucleation temperature range which, of course, will vary with the particular glass composition. However, when expressed in terms of glass viscosity, it is usually in a range from $10^{10}$ to $10^{14}$ poises, generally about $10^{11.5}$ poises. After nucleation is completed, the temperature of the thermally crystallizable glass is increased to within a range where more rapid crystallization occurs, but usually not above about $10^8$ poise temperature of the original glass. On the other hand, crystallization can be effected at the nucleation temperature in the range given by taking a longer time, especially at glass viscosities above $10^{14}$ poises. The length of time that is necessary for fusion, nucleation and crystallization to take place will vary with composition, and with the size of the article, such as a telescope mirror blank, which is being produced. While from 2 to 100 hours may be adequate for a small mirror blank, 1000 or even more hours will be necessary for a telescope mirror blank several hundred inches in diameter and having a thickness of about one-sixth of the diameter. This is necessary because glass is a very poor conductor of heat and it takes time to heat the interior of the mirror blank. However, due to the arrangement of the spheres, a plurality of passageways are provided throughout the core member and the temperature within the mirror blank may be regulated by passing heated fluid therethrough. If hollow spheres having one or more openings therein are utilized, the fluid will also pass therein and/or therethrough, thus also regulating the temperature inside the spheres. The temperature of the fluid, of course, would be controlled so that the temperature within the center of the mirror blank would be substantially the same as that at the outer surfaces. One method for so treating hollow members of thermally crystallizable material is disclosed in the Keefer application referred to above, and such a method is also incorporated herein by reference.

If the crystallization is effected at substantially the same low temperature as the sealing and nucleation, crystallization times can be very long, and times of 500 to 2000 hours and longer are sometimes necessary.

While telescope mirror blanks of the present invention can be formed from spheres of various vitreous compositions which have been used heretofore, such as fused silica, borosilicate glass and the like, it is preferred to utilize thermally crystallizable glasses, and particularly those of the lithium aluminosilicate system capable of being thermally in situ crystallized to form glass-ceramics, preferably transparent, having a lineal coefficient of thermal expansion which is relatively low and can be about zero.

While glass-ceramic telescope mirror blanks made in accordance with the invention are preferably transparent, they can also be opaque. However, it is considerably less difficult to mount a transparent telescope mirror upon its mountings and insure its being in a strain-free condition than it is to mount an opaque mirror. The reason, of course, is the ability to inspect the interior of the transparent mirror during the mounting process.

Low expansion glass-ceramic telescope mirror blanks can be formed by thermal in situ crystallization of the preferred thermally crystallizable base glass compositions. Compositions disclosed in Ser. No. 386,693, filed July 31, 1964 and now abandoned, and its continuation-in-part Ser. No. 464,147, filed June 15, 1965 now abandoned, both assigned to the assignee of the present application, are useful in the performance of the invention as are the compositions disclosed in aforesaid application Ser. No. 518,446. Broadly, these are thermally crystallizable glasses having a composition consisting essentially of the following components, present in the glass in the following weight percentages:

TABLE A

| Components: | Weight percent |
|---|---|
| $SiO_2$ | 56–70 |
| $Al_2O_3$ | 18–27 |
| $Li_2O$ | 3.4–4.5 |
| CaO | 0–3 |
| ZnO | 0–2 |
| $B_2O_3$ | 0–4 |
| $TiO_2$ | 0–6 |
| $ZrO_2$ | 0–3 |
| MgO | 0–3 |
| $Na_2O$ | 0–1 |
| $P_2O_5$ | 0–3 |
| $(SiO_2+Al_2O_3)$ | at least 82 |
| $(SiO_2+Al_2O_3+B_2O_3+P_2O_5)$ | 86–91 |
| $(CaO+MgO+ZnO+Na_2O)$ | 2.5–6 |
| $(SiO_2+Al_2O_3+P_2O_5+Li_2O)$ | no more than 93 |
| $TiO_2+ZrO_2$ | 2–6 | wherein the ratio of $(CaO+MgO+ZnO+Na_2O+B_2O_3)$ to $Li_2O$ is less than 2.4 and the ratio of $SiO_2$ to $Al_2O_3$ is no more than 3.8.

Specific compositions of thermally crystallizable glasses useful in the performance of the present invention and coming within the above composition range are Examples 36, 37, 39–49, inclusive, and Examples H through M, described in Tables VIII and VIIIA of the aforesaid application Ser. No. 464,147, which examples are incorporated herein by reference.

In the embodiment where sealing is effected at a temperature higher than the nucleation step, and where the parts to be sealed are massive, care must be taken in choosing compositions from among the species or composition range set forth in the application mentioned. Thus, if the mirror as in FIG. 2 or FIG. 9, for example, is, say, one foot or more thick, the compositions should have a relatively low rate of nucleation or "nuclei" formation, as well as a low rate of bulk crystal growth.

The reasons for the necessity of low rates of nucleation and bulk crystal growth are several. First, when the glass parts are cooled prior to assembly, even quickly, nuclei will form and even grow to a size which will not redissolve in the rapid heating step to the fusion temperature, if the rate of nuclei formation is too high. Then more nuclei could form when passing through the range of temperatures for high rates of nuclei formation (corresponding to about $10^{12}$ to $10^{11}$ poises for instance). If this happens, crystals can form too quickly to allow time for glass-to-glass fusion, since this fusion is effected at temperatures where crystal growth rates are near their maximum for a given glass.

Also, the crystal growth rate must be relatively low even if the nuclei formation rate of the bulk glass is low because, as is well known, glass crystallizes more easily on the surface than elsewhere, because of energy considerations at the surface or because of surface impurities from the ambient atmosphere, etc. Formation of surface crystals also impedes the making of a proper glass-to-glass seal.

Another problem is that, even after the seals are successfully effected at a temperature corresponding, for instance, to a temperature where the viscosity is about $10^8$ poises, the sealed and massive structure must be cooled down to the temperature range where the nuclei formation rate is significantly high and the crystal growth rate is quite low. Because of the large thickness of the parts in the structure, this cooling cannot be effected as rapidly as would be desired, and crystallization will take place (after a few nuclei form) while cooling from the sealing temperature down to the desired nucleation temperature step range, resulting in undesirably large crystals, opaque bodies or nonuniformly crystallized products. Thus, while cooling, the interior may remain hotter longer than portions near the surface, and this can result in nonuniform coefficients of expansion through a cross-section of a given structural member, because of nonuniform crystallization and premature crystallization in the interior hotter portions of the mirror, unless the glass is both slow to nucleate and slow in growing crystals. However, in the present invention, by passing heated fluid through the sphere core assembly passageways, a greater degree of temperature control can be maintained with respect to the interior of the blank.

In order to limit the rates of nucleation and crystal growth, especially for sealing relatively massive parts in this high temperature sealing embodiment, it is preferred to limit the compositions used within the broad range set forth hereinbefore to those compositions consisting essentially of the following:

TABLE B

| Component: | Weight percent |
|---|---|
| $SiO_2$ | 56–70 |
| $Al_2O_3$ | 18–27 |
| $Li_2O$ | 3.4–4.5 |
| CaO | 0–3 |
| ZnO | 0–<0.5 |
| $B_2O_3$ | 0–4 |
| $TiO_2$ | 0–2 |
| $ZrO_2$ | 0–2 |
| MgO | 0–3 |
| $Na_2O$ | 0–1 |
| $P_2O_5$ | 0–<1.5 |
| $(SiO_2+Al_2O_3)$ | at least 82 |
| $(SiO_2+Al_2O_3+B_2O_3+P_2O_5)$ | 86–91 |
| $(CaO+MgO+ZnO+Na_2O)$ | 2.5–6 |
| $(SiO_2+Al_2O_3+P_2O_5+Li_2O)$ | no more than 93 |
| $TiO_2+ZrO_2$ | 2–3.5 | wherein the ratio of $(CaO+MgO+ZnO+Na_2O+B_2O_3)$ to $Li_2O$ is less than 2.4 and the ratio of $SiO_2$ to $Al_2O_3$ is no more than 3.8.

Even more preferably, in the compositions given above, the $TiO_2$ is 0–1.5 weight percent, and the total of $TiO_2$ plus $ZrO_2$ is 2–3 weight percent.

Other compositions suitable for the products and for carrying out the process of this invention are given in the specific examples.

The transparent crystallized glass-ceramic formed as mentioned above contains as the predominant crystalline species lithium-containing crystalline phases selected from the group consisting of beta-eucryptite or beta-eucryptite-like crystals and beta-spodumene or beta-spodumene-like crystals or mixtures thereof, as indicated by X-ray diffraction data. The resulting ceramic product contains a multitude of such crystalline species which are distributed in random orientation throughout the crystallized glass-ceramic and which are dispersed in a glassy matrix remaining as a result of the in situ crystallization. Substantially all of the crystals of this ceramic are of a diameter less than ⅓ micron measured across the largest lineal dimension of the crystals. The glass ceramic has an average lineal coefficient of thermal expansion in the range of about $-10 \times 10^{-7}$ to $+10 \times 10^{-7}$ (0–300° C.) and preferably of about $-3$ to $+3 \times 10^{-7}$, although glass-ceramics of essentially zero expansion are readily produced.

The ultimate telescope mirror blanks and telescope mirror formed therefrom have a lineal coefficient of thermal expansion of the glass-ceramic in the range from $+10$ to $-10 \times 10^{-7}/°$ C. over the range 0 to 300° C., and is preferably about zero over the range 0 to 300° C. or over the range the mirror will be subjected to during use. Furthermore, while the diameter of the crystals within the transparent ceramic is preferably less than about ⅓ micron measured along the largest lineal dimension of the crystals, it is preferred that the crystals be of a diameter less than about ¼ micron in size; the best results are evident when the diameter is less than about 1/10 micron in size.

The disclosures in the aforementioned applications Ser. No. 467,147 and Ser. No. 518,446 relating to thermally crystallizable glass compositions set forth in Tables A and B are incorporated herein by reference. As fully disclosed in the aforementioned pending applications, the final coefficient of thermal expansion of the glass-ceramic is determined by the composition of the thermally crystallizable glass and by the particular heat treatment to which it was subjected.

The importance of the transparency resides in the fact that it facilitates grinding and polishing of the reflecting surface prior to the application of the aluminum coating. However, the structure can also be made to be opaque by permitting the crystallization to continue to the point where the crystals are large enough to make the blank opaque. This can be accomplished by having the final crystallization temperature at above about 1500° F. for a long period of time or above about 1600° F. for a shorter time. The time-temperature factors depend upon the composition and its viscosity at such temperature. Some difficulties may on occasion be encountered by the presence of large crystals because of interference with the polishing and grinding of the reflecting surfaces. For example, if large crystals are removed, the surface cannot be ground to the necessary smoothness. Moreover, when an opaque structure is used, its coefficient of thermal expansion is generally much higher than that of the transparent glass ceramic of the same composition. Therefore, care must be taken not to impart to the opaque crystallized glass a high coefficient of thermal expansion and it is preferred to have a coefficient in the range $+10$ to $-10 \times 10^{-7}$ (0–300° C.).

A mirror blank having a concave surface can be made in accordance with the process of the present invention by the usual methods involving grinding, polishing and figuring to form the desired astronomical configuration and curvature, although a mirror having a concave surface can be made at the outset, as illustrated in FIG. 15 and discussed above. By making the reflecting surface concave at the outset, the amount of work necessary to grind, polish and figure the surface is considerably reduced. A thin coating of aluminum is then usually applied on the prepared surface in accordance with known methods, although any other suitable means to render the face surface reflectant can be employed.

The terms "beta-eucryptite crystals and beta-eucryptite-like crystals" have been used in an alternative sense. Thus, while beta-eucryptite is often thought of as a species crystal having one mole of lithia, one mole of alumina and two moles of silica, both terms are used in this application to designate crystalline species having the beta-eucryptite structure as shown by X-ray diffraction but the peaks can be shifted slightly depending on whether there is a definite amount of silica present other than exactly two moles, either more or less silica than two moles. Similarly, the terms "beta-spodumene crystals and beta-spodumene-like crystals" are used alternatively and in a generic sense, specifying crystalline species that have the crystalline structure of beta-spodumene that contains four moles of silica to one of alumina and one of lithia but with the peak shifted somewhat when the crystalline structure contains more or less than four moles of silica. In the claims, therefore, the terms "beta eucryptite and beta spodumene" are each used in this generic sense.

The following examples will serve to illustrate the present invention and are not considered limiting thereof in any way.

EXAMPLE I

A thermally crystallizable glass composition containing the following ingredients based on the total weight of the composition is suitable for preparation of the lightweight mirror blank of the present invention:

| Component: | Weight percent |
|---|---|
| $SiO_2$ | 68.4 |
| $Al_2O_3$ | 22 |
| CaO | 2 |
| $Li_2O$ | 3.9 |
| $TiO_2$ | 1 |
| $ZrO_2$ | 1.5 |
| $Na_2O$ | 0.7 |
| $K_2O$ | 0.2 |
| $Sb_2O_3$ | 0.3 |

The glass is molded to form solid spheres which are then arranged in a suitable 16-inch circular jig of the type illustrated in FIG. 15, i.e., between a perforated backup plate and the upper layer which will eventually be the reflecting layer, both layers being of the same glass composition. The assembly is then heated in an oven to above the annealing point of the glass and then heated rapidly, at the rate of more than 10° C. per minute to 1750° F. where the glass viscosity is about $10^8$ poises. The assembly is maintained at this temperature for 2 hours. Thereafter the structure is subject to a heat treatment at 1350° F. for 260 hours and 1600° F. for 1 hour. Heated air is passed through the layer of spheres and the temperature of the air is the same as the oven temperature. A satisfactory, transparent, crystallized mirror blank of nearly zero coefficient of thermal expansion (0–300° C.) is obtained.

EXAMPLE II

The following thermally crystallizable glass composition is used to make a lightweight mirror blank. All components are indicated in weight percent based on the total composition:

| Component: | Weight percent |
|---|---|
| $SiO_2$ | 69.3 |
| $Al_2O_3$ | 20.2 |
| CaO | 2.9 |
| $Li_2O$ | 3.8 |
| $ZrO_2$ | 2.6 |
| $P_2O_5$ | 1.2 |

In this example, the spheres, one inch in diameter, are formed in suitable molds and air quenched to minimize nuclei formation. Thereafter, the component parts are arranged and assembled in the manner shown in FIGS. 1 and 2 to form the mirror blank with the backup plate and the upper plate. The spheres which are to be located at the outer periphery and sides of the mirror blank are readily cut to the desired size until a unitary mirror blank having a 16-inch diameter is formed within the jig or mold.

The assembly is heated for one hour to 1100° F. then slowly heated to the annealing point of about 1350° F. Heating is thereafter continued at a rapid rate to 1800° F. where it is held for two hours. The structure is then rapidly cooled to 1350° F., where it is held for 264 hours, and then heated to 1575° F. where it is held for 144 hours. Because of the passageways throughout the core, the inner spheres are heated by convective heat passing through the passageways. The transparent, crystallized mirror blank structure has a positive coefficient of thermal expansion (0–300° C.) of less than $10 \times 10^{-7}/°$ C.

EXAMPLE III

Example II is repeated but the heat treatment of 264 hours followed by 1575° F. for 144 hours is changed to 1350° F. for 480 hours, followed by 1575° F. for 24 hours. The transparent, crystallized mirror blank structure has a coefficient of thermal expansion of $0.5 \times 10^{-7}/°$ C.

As will be understood from the foregoing description of the invention, the weight of the core member supporting the reflecting surface of the mirror can be readily controlled by utilizing the various embodiments of the invention illustrated above. Thus, the lightest weight core will be one having the four-sphere contact arrangement illustrated in FIGS. 1–3 and 7–7A. In this arrangement, 52.4% of the space between the upper plate and backup plate is occupied by the spheres. This is a reduction in weight of 47.6% over an ordinary solid core member. The six-sphere contact arrangement utilized in the embodiments of FIGS. 11 and 11A occupy 68.1% of the space and the closest packing which can be utilized, i.e., that of FIG. 10, occupies 74.1% of the space.

For example, a solid, 40-inch mirror blank, weighing 752 lbs. would weigh 557 lbs. utilizing FIG. 10 sphere arrangement, 512 lbs. utilizing the FIG. 11 arrangement and 394 lbs. utilizing the FIG. 1 and FIG. 7 arrangements. The more the number of contacts between spheres, the more rigid the core structure. Accordingly, those arrangements wherein the spheres in an inner layer of spheres are in contact with twelve other spheres are preferred since the core will be the most rigid. While this means that the weight of the core cannot be the lightest, as it would be if the FIG. 1 core arrangement were used, the weight of the core can be reduced, however, by utilizing hollow spheres, such as shown in FIGS. 4 and 6.

The following table shows the "lightweighting" possible of a mirror blank of the FIG. 10 embodiment when hollow spheres are used, keeping in mind that a solid sphere has a volume of 4.19 $R^3$:

TABLE C

| Radius of inside sphere | Volume of inside sphere | $\Delta V$ outside-inside sphere | Ratio of sphere vol. to 5.66, percent | Wt. lbs. 40″ dia. mirror |
|---|---|---|---|---|
| 0 | 0 | $4.19R^3$ | 74.1 | 557 |
| .5R | $.52R^3$ | $3.76R^3$ | 64.8 | 487 |
| .6R | $.91R^3$ | $3.28R^3$ | 58.0 | 436 |
| .7R | $1.44R^3$ | $2.75R^3$ | 48.6 | 365 |
| .8R | $2.15R^3$ | $2.04R^3$ | 36.0 | 271 |
| .9R | $3.05R^3$ | $1.14R^3$ | 20.1 | 151 |

The use of closely packed hollow spheres would also be suitable for constructing monolithic articles which would float in water, such as landing docks, rafts, platforms and the like. This can be accomplished by making the diameter of the spheres equal to one. Utilizing the FIG. 1 arrangement, the radius of the inner sphere will be 0.62R; with the FIG. 11 arrangement, the radius would be 0.74R; and with the FIG. 10 arrangement, the radius would be 0.77R, R being the radius of the outer sphere.

While particular sphere arrangements have been disclosed and illustrated, other arrangements will now become obvious from the foregoing teaching of the invention. While up to three layers of spheres have been illustrated, this is not to be considered as being a limitation, since the number of layers to be utilized will depend upon the size of the mirror blank, the size of the spheres and the composition thereof. As will also be appreciated, all of the spheres within each layer will have one outer portion thereof in contact with a plane passing either above or below the layer of spheres, i.e., the plane will be at a tangent to each sphere.

From the foregoing description of the invention it will be understood how glass articles, or crystallized glass articles, including telescope mirror blanks, can readily be formed by uniting a plurality of spheres while taking advantage of the pressure applied to each surface of the spheres by the force of gravity of the spheres above it and by the upper plate. The significance of applicant's invention will be better appreciated, for example, when one wishes to form a reflecting telescope mirror of a diameter of several hundred inches, which mirror must be transported hundreds or thousands of miles to the site for the astronomical telescope. By utilizing applicant's invention, the individual spheres can be made and shipped to the site where the mirror is to be installed. All that will then be necessary is to provide a furnace large enough for treatment of the assembled mirror in accordance with a process described supra.

It will be apparent from the foregoing that many advantages are inherent in the present invention. Included are low thermal expansion characteristics, excellent transparency, high strength and the like. Although the drawing shows several embodiments of the present invention, it is to be noted that other embodiments can also be made according to the teachings of the present invention. Besides telescope mirror blanks, glass articles or crystallized glass articles made in accordance with the disclosed invention will find uses as curtain walls, fire doors, tank linings, where strength is a prime requisite, flooring blocks, containers, storage bins, and the like.

What is claimed is:

1. A method of forming a thermally crystallized mirror blank comprising
   (a) assembling a plurality of thermally crystallizable glass spheres together in at least one layer wherein adjacent spheres are in contact with each other,
   (b) placing a thermally crystallizable glass plate on top of said at least one layer of spheres,
   (c) raising the temperature of the assembly to a sufficiently high temperature range wherein no nucleation of said glass will take place and where fusion sealing can be effected,
   (d) holding said assembly at said temperature range until said adjacent spheres are fusion sealed together at contacting surfaces and to said plate,
   (e) effecting nucleation in a nucleation step by holding said assembly in a temperature range substantially lower than the temperature range of said fusion sealing step (d), and
   (f) thereafter thermally crystallizing said assembly by further heating, each of said spheres in said at least one layer being tangent to a plane disposed below said layer.

2. The method defined in claim 1 wherein a heated fluid is passed through the passageways formed by said spheres in contact during at least a portion of the heat treatment.

3. A method as defined in claim 2 wherein the heated fluid is maintained at the temperature necessary to perform each of the steps defined in steps (c), (d), (e) and (f).

4. A method of claim 1 wherein the temperature range of step (c) is that corresponding to a glass viscosity of $10^9$ to $10^5$ poises.

5. A method of claim 1 wherein the temperature is raised to step (c) by heating at a rate of more than 10° C. per minute after the assembly is first heated to at least its annealing point.

6. A method of claim 1 wherein step (e) is effected in a temperature range corresponding to a viscosity of the original glass of $10^{10}$ to $10^{14}$ poises.

7. The method of claim 1 wherein step (e) is effected in a temperature range corresponding to a viscosity of the original glass of $10^{10}$ to $10^{14}$ poises.

8. A method of forming a thermally crystallized mirror blank comprising
   (a) assembling a plurality of thermally crystallizable glass spheres together in at least one layer wherein adjacent spheres are in contact with each other,
   (b) placing said at least one layer of glass spheres between two thermally crystallizable glass plates,
   (c) raising the temperature of the assembly to a sufficiently high temperature range wherein no nucleation of said glass will take place and where fusion sealing can be effected, (d) holding said assembly at said temperature range until said adjacent spheres are fusion sealed together at contacting surfaces and to said plates, (e) effecting nucleation in a nucleation step by holding said assembly in a temperature range substantially lower than the temperature range of said fusion sealing step (d), and (f) thereafter thermally crystallizing said assembly by further heating, each of said spheres in said at least one layer being tangent to a plane disposed below said layer.

References Cited

UNITED STATES PATENTS

| | | | |
|---|---|---|---|
| 1,888,341 | 11/1932 | Winckler | 65—37 |
| 2,086,185 | 7/1937 | Keaney | 65—58 |
| 3,246,972 | 4/1966 | Smith | 65—33 |
| 3,346,357 | 10/1967 | Bank | 65—33 |

OTHER REFERENCES

Van Vlaek, Physical Ceramics for Engineers, 1964, pp. 234–5.

Handbook of Glass Manufacture, volume II, by Fay V. Tooley, published by Ogden Publishing Co., New York, N.Y., p. 192, 1960.

FRANK W. MIGA, Primary Examiner

U.S. Cl. X.R.

65—36, 37, 38, 58; 161—162